United States Patent
Kassahun et al.

(10) Patent No.: US 12,160,367 B2
(45) Date of Patent: Dec. 3, 2024

(54) COST-EFFECTIVE CONTROL OF MULTIPLE TRANSPORTS OF AN SD-WAN GATEWAY

(71) Applicant: HUGHES NETWORK SYSTEMS LLC, Germantown, MD (US)

(72) Inventors: Solomon Emirie Kassahun, Gaithersburg, MD (US); Roderick James Ragland, Olney, MD (US); Douglas Merrill Dillon, Rockville, MD (US)

(73) Assignee: HUGHES NETWORK SYSTEMS LLC, Germantown, MD (US)

( * ) Notice: Subject to any disclaimer, the term of this patent is extended or adjusted under 35 U.S.C. 154(b) by 331 days.

(21) Appl. No.: 17/729,014

(22) Filed: Apr. 26, 2022

(65) Prior Publication Data
US 2023/0344764 A1    Oct. 26, 2023

(51) Int. Cl.
*H04L 41/122*    (2022.01)
*H04L 12/66*    (2006.01)
*H04L 41/342*    (2022.01)
*H04L 45/76*    (2022.01)

(52) U.S. Cl.
CPC ............. *H04L 45/76* (2022.05); *H04L 12/66* (2013.01); *H04L 41/122* (2022.05); *H04L 41/342* (2022.05)

(58) Field of Classification Search
CPC ....... H04L 45/76; H04L 12/66; H04L 41/122; H04L 41/342; H04L 41/0806; H04L 45/123; H04L 43/08; H04L 43/20; H04L 45/24; H04L 45/50; H04L 45/70; H04L 43/0811; H04L 45/247; H04L 45/645; H04L 45/22

See application file for complete search history.

(56) References Cited

U.S. PATENT DOCUMENTS

| | | | |
|---|---|---|---|
| 10,178,035 B2 | 1/2019 | Dillon | |
| 10,496,725 B2 | 12/2019 | Dillon | |
| 10,637,782 B2* | 4/2020 | Dillon | H04L 47/24 |
| 10,739,464 B2 | 8/2020 | Harrington et al. | |
| 11,108,677 B2* | 8/2021 | Lui | H04L 47/10 |
| 11,212,223 B2* | 12/2021 | Gupta | H04L 45/302 |

(Continued)

FOREIGN PATENT DOCUMENTS

| | | |
|---|---|---|
| EP | 3414932 A1 | 12/2018 |
| WO | 2017139699 A1 | 8/2017 |

OTHER PUBLICATIONS

International Search Report and Written Opinion issued Jul. 27, 2023 in corresponding PCT/US2023/018181.

*Primary Examiner* — Abdullahi E Salad
(74) *Attorney, Agent, or Firm* — NovoTechIP International PLLC

(57) ABSTRACT

A network communication system which provides cost effective support for two or more WAN transports from a single SD-WAN site. The network communication system, may at times by default, monitor a higher-cost WAN for only basic connectivity to reduce monitoring costs of the transport. Where an application is properly configured, the system may override the default to monitor a higher-cost WAN for acceptable performance (i.e., monitored for connectivity, packet loss, latency, jitter & capacity) even when that WAN is not selected as active transport.

13 Claims, 12 Drawing Sheets

(56) References Cited

U.S. PATENT DOCUMENTS

| | | |
|---|---|---|
| 11,252,089 B2 | 2/2022 | Dillon |
| 11,329,950 B2* | 5/2022 | Mishra .................... H04L 67/10 |
| 11,381,474 B1* | 7/2022 | Kumar ................ H04L 41/0897 |
| 11,381,511 B2 | 7/2022 | Chin et al. |
| 2019/0349259 A1* | 11/2019 | Rovner ................. H04L 1/0002 |
| 2020/0204452 A1* | 6/2020 | Bhat .................... H04L 41/0677 |
| 2021/0144065 A1* | 5/2021 | Bhat ........................ H04L 41/14 |
| 2023/0412423 A1* | 12/2023 | Krovatkina ............. H04L 45/76 |

* cited by examiner

COST-EFFECTIVE CONTROL OF MULTIPLE TRANSPORTS OF AN SD-WAN GATEWAY

BACKGROUND

A computer device is often connected to other computer devices which are remotely located over a wide area network (WAN). A software defined WAN (SD-WAN) is one wherein the WAN is programmatically configured and managed. The SD-WAN has the ability to automatically and selectively route traffic on the WAN depending on network conditions or traffic characteristics. Packets may be steered onto a particular link because another link is down or not working well. Further, the SD-WAN may be used to balance network traffic across all available links to achieve optimal performance. SD-WAN technology can also identify packets by application, user, source/destination, etc. and send them down one path or another based on those characteristics. Devices in the SD-WAN follow rules from a central SD-WAN controller. An SD-WAN gateway is networking hardware that routes data on the WAN.

An SD-WAN gateway may have multiple connections using different transports. Transports may include multiprotocol label switching (MPLS), broadband internet, long term evolution communication standard (LTE), etc. Geosynchronous Earth Orbit (GEO), Medium Earth Orbit (MEO) and Low Earth Orbit (LEO) satellite links could also provide WAN transport links. These different transport connections have different characteristics including cost and latency. For example, GEO satellite links can be relatively cost effective but have a higher latency. GEO satellite links may be used in conjunction with a higher-cost low-latency transport in order to optimize for cost and responsiveness. The SD-WAN controller must select which transport to use for a given communication. Hence there is a need to cost-effectively support and control selection of WAN transports from a single SD-WAN site to provide a responsive, and high-quality end-user experience while managing cost.

SUMMARY

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

An example implementation provides a software defined wide area network (SD-WAN) device comprising: a plurality of WAN transports that connect a client device to a network resource; a processor with a memory, wherein the memory stores instructions that, when executed, cause the processor to perform the functions of: selecting an active WAN transport from the plurality of WAN transports to provide internet services to a client device connected to the SD-WAN over the active WAN transport; using the active WAN transport for a duration of time while performing active transport monitoring and backup transport monitoring; and wherein the backup transport monitoring includes determining that a WAN transport is set for testing only basic connectivity, and where the WAN transport is set for testing only basic connectivity performing transport characteristic evaluation for connectivity of the WAN transport to limit resource costs of monitoring the backup resource.

An example implementation provides a method of communicating over a communication system comprising: selecting an active WAN transport connected to an SD-WAN from a plurality of network WAN transports to provide internet services to a client device connected to the SD-WAN over the active WAN transport; and using the active WAN transport for a duration of time while performing active transport monitoring and backup transport monitoring; wherein the backup transport monitoring includes determining that a WAN transport is set for testing only basic connectivity, and where the WAN transport is set for testing only basic connectivity performing transport characteristic evaluation for connectivity of the WAN transport to limit resource costs of monitoring the WAN transport.

An example implementation method for software defined wide area network (SD-WAN) device, comprising: a plurality of WAN transports that connect a client device to a network resource; a processor with a memory storing instructions that, when executed, cause the processor to perform the functions of: selecting an active pair of WAN transports from the plurality of WAN transports to provide internet services to a client device connected to the SD-WAN over the pair active WAN transports; using the active pair of WAN transports for a duration of time while performing active transport monitoring and backup transport monitoring; wherein: backup transport monitoring includes determining that the backup WAN transport is set for testing only basic connectivity, and where the WAN transport is set for testing only basic connectivity then performing transport characteristic evaluation for connectivity of the WAN transport to limit resource costs of monitoring the backup resource; determining that the backup WAN transport is set for testing only basic connectivity comprises checking a parameter for the backup WAN transport in the SD-WAN device; and by default, setting the backup WAN transport for testing only basic connectivity and checking whether the parameter for the WAN transport in the SD-WAN device may override the default.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
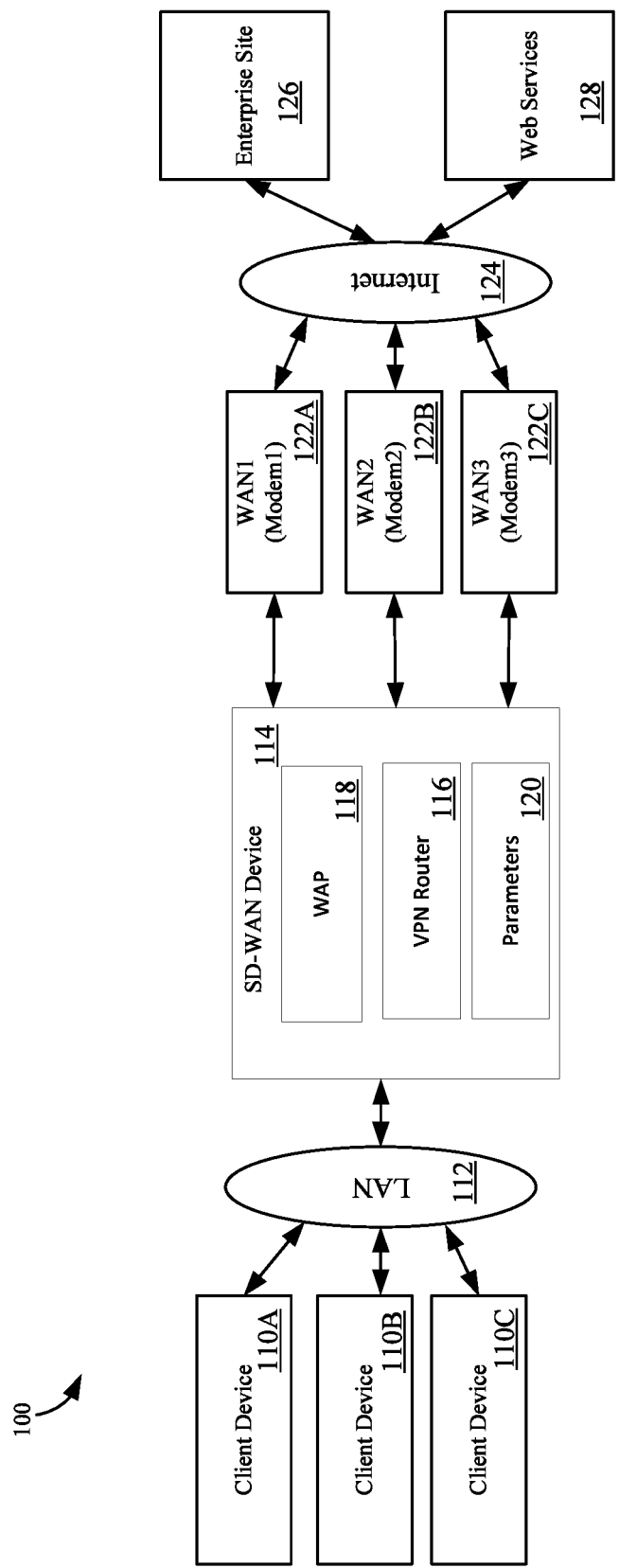
FIG. 1 is a block diagram depicting a communication network with multiple WAN transports in accordance with example embodiments.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The described SD-WAN system may select between multiple transports that have different characteristics including cost and performance. Embodiments of the described SD-WAN system can provide cost effective support for two or more WAN transports from a single SD-WAN site. Wan transports may, for example, include combinations of GEO, LEO, 4G/5G LTE from potentially multiple providers, fixed wireless and cable modems to provide a good, responsive, high-throughput end-user experience at the best possible cost. The system can support client devices using the least expensive transports in terms of usage cost (e.g. LEO verses 4G/5G) except when the higher cost transports are needed for better performance reasons. In making the selection of the transports, the system may need to monitor the transports for connectivity and performance. Monitoring the multiple transports when they are not actively being used may be costly where data must be sent over the transport to monitor the connection and performance.

As described herein, a SD-WAN system may overcome the problem of high usage costs by monitoring the transports in a cost-effective way such that the more expensive transports in terms of usage cost are avoided except when those transports are needed or anticipated will be needed. This allows the system to offer the best application performance in terms of cost, available bandwidth, low-latency and low-jitter. To reduce costs, monitoring of a backup transport may be limited to only testing for basic connectivity which requires little bandwidth for monitoring. However, if the appliance or application is configured to trigger transport switchover when the active transport changes to a brownout status, the backup may need to be monitored for more than just connectivity.

The need to carefully monitor transport connectively and performance is especially important in mobility situations where the set of available WAN transports shifts as the terminal changes location and where those transports available in remote locations are typically metered with high usage costs. An example of a changing terminal location with varying costs includes maritime applications. In a maritime application, the available WAN connections for consideration could include WiFi, wired internet, LTE, GEO and LEO. For lowest cost, WiFi or wired internet access could be used at port with GEO and/or LTE as backup. For a medium cost application, LTE could be used with GEO when close enough to a cellular tower or a base-station that LTE is available with LEO as backup. LEO and GEO could be used when at sea and LTE is not available. Another example of mobile transports is aeronautical and land mobile deployments. A medium cost combination for these mobile transports may include LTE plus GEO where LTE is available. Another combination may include LEO plus GEO when traveling over ocean regions or land masses with no LTE availability.

Figure 2:
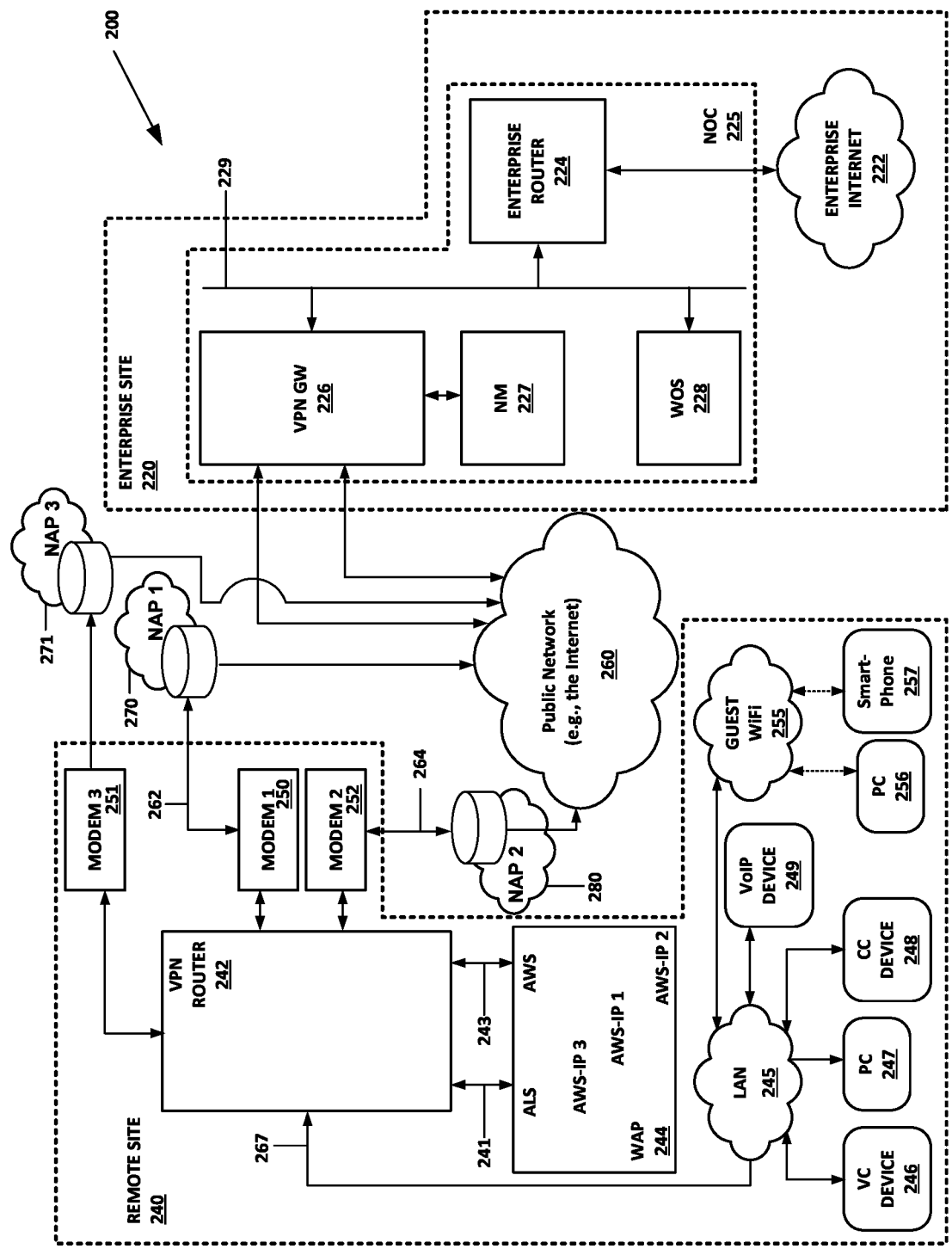
FIG. 2 is a block diagram depicting another communication network with multiple WAN transports in accordance with example embodiments.

FIG. 1 is a block diagram depicting a communication network 100 with multiple WAN transports in accordance with example embodiments. FIG. 1 depicts one possible embodiment with an SD-WAN device 114 that includes a combined virtual private network (VPN) Router 116 and WAN acceleration appliance (WAP) 118. An example of a WAP is described below with reference to FIG. 2. The SD-WAN device 114 may also be commonly referred to as a SD-WAN router. The SD-WAN device 114 may also include stored parameters 120 used in conjunction with the modems as described further below. A number of client devices may be connected and communicate on the communication network 100. In this example, three client devices 110A, 110B, 110C (collectively client devices 110) are shown connected to the communication network. Examples of client devices (or user devices) are illustrated in FIG. 2 and described below. The client devices 110 in this example communicate over a local area network (LAN) 112 to the SD-WAN device 114. The SD-WAN device 114 may communicate with and control a number of modems for WAN transports. In this example, the SD-WAN device 114 communicates with WAN1 122A, WAN2 122B and WANC 122C (collectively referred to as WANs 122). The WANs 122 may be connected to a public network such as the internet 124. The WANs 122 may connect through the internet 124 to network resources such as an enterprise site 126 or to various web services 128. As used herein, WAN transports comprise the WANs (modems) 122, and the associated paths and service providers that support the network access over the WANs 122.

FIG. 2 is a block diagram depicting an example communications network 200 including multiple WAN transports. In this example, each of the WAN transports can carry a respective acceleration (e.g., VPN) tunnel. FIG. 2 depicts one possible embodiment for the implementation of a VPN Router 242 and the WAN acceleration appliance (WAP) 244 as separate components. These devices together represent an example of the SD-WAN device 114 in FIG. 1. As would be recognized by one of skill in the art, other embodiments for the implementation would also be possible (e.g., implementing the WAP 244 within a separate core of the VPN Router), without departing from the spirit and scope of the present invention. The same holds true for the implementation of the VPN gateway (GW) 226 and the WAN optimization server (WOS) 228. In this example, the WOS 228 is the peer to the WAP 244, where many WAPs will terminate their connections to a WOS. The WOS 228 and WAP 244, when used together, provide optimal path selection, traffic classification, end-to-end data path reliability along with the other features identified in the application. Further, while the embodiment of FIG. 2 depicts a single VPN GW and WOS on the LAN 229, one skilled in the art would recognize that alternative embodiments may be employed (e.g., with multiple VPN GWs and/or multiple WOSs on the LAN for redundancy purposes and/or other network scaling purposes), without departing from the spirit and scope of the present invention.

With reference to FIG. 2, the communications network 200 includes the enterprise site 220, the remote site 240 the public network 260, and the network access providers 270 (NAP 1), 280 (NAP 2) and 271 (NAP3) (collectively referred to as NAPs. The public network 260 can be any publicly accessible wide area network, such as the internet. The enterprise site 220 may be an enterprise corporate headquarters or other large corporate facility, while the remote site 240 reflects a remote corporate office or other remote facility (e.g., a remote retail facility) of the enterprise. Each of the network access providers, NAP 1 270, NAP 2 280 and NAP 3 271, is a third-party access provider who provides connectivity and broadband communications services for the remote site 240 over the public network 260. For example, each of the NAPs provides access to the public network 260 to the remote site 240 via a respective transport medium, such as cable, DSL, fiber, 4G, satellite (e.g., VSAT), MPLS, T1, etc., and provides broadband communications services over the public network 260.

The remote site 240 includes modem1 250, modem 2 252, modem3 251 the VPN router, 242 the WAP 244 (also referred to herein as an acceleration appliance (AA)), and the local area network (LAN) 245. The remote site further includes a number of client or user devices connected to the LAN 245. The client devices could, for example include videoconferencing (VC) device 246, the personal computer (PC) 247, the credit card (CC) device 248 and the voice over Internet protocol (VOIP) device 249, and the guest WiFi network 255 wirelessly connected to the laptop PC 256 and the smart-phone 257. One skilled in the art, however, would recognize that the networked devices connected to the LAN and to the guest WiFi are not limited to such, but can also include, printers, scanners, copiers, or any other network-enabled electronic device. Each of the modems provides a connection from the remote site to a respective NAP via a respective transport medium (e.g., cable, DSL, fiber, 4G, satellite (e.g., VSAT), MPLS, T1, etc.) and protocol (e.g., Internet protocol or IP). For example, the modem 1 may provide a fiber connection to the NAP 1, and the NAP 1 provides Internet services to the remote site 240 over the fiber connection via the modem 1. Similarly, the modem 2 may provide an MPLS connection to the NAP 2, and the NAP 2 provides Internet services to the remote site 240 over the MPLS connection via the modem 252. A modem with its associated NAP and connections can be considered a "transport" as the term is used herein. The connection between the remote site modem and the respective NAP is often referred to as the "last mile" or the "last mile link." The LAN provides local connectivity for devices at the remote site to access the public network or Internet services provided to the remote site via the modems 250, 252. By way of example, such local devices may include a VOIP device 249 that provides VOIP telecom services to VOIP handsets throughout the remote site, a credit card device 248 that provides credit card authorizations for point-of-sale (POS) transactions performed at the remote site, one or more personal computers 247 for employees at the remote site, and videoconferencing device 246 for providing videoconferencing between the remote site 140 and the enterprise site 120.

The enterprise site 220 includes the Network Operations Center (NOC) 225 and the enterprise intranet 222, and the NOC 225 includes the VPN gateway (GW) 226, the network manager (NM) 227, the WAN optimization server (WOS) 228 (which may also be referred to herein as an acceleration gateway (AGW)) and the enterprise router 224. The VPN gateway and the WOS are interfaced together via the gateway subnet 229. In alternative embodiments, the NOC 225 can include further VPN gateways and acceleration gateways interfaced on the gateway subnet 229, where such further gateways may be included for gateway redundancy and other design purposes. The enterprise intranet provides connectivity for devices throughout the enterprise site and provides corporate networking services to employees via such devices. The enterprise router provides the routing functionality for the corporate networking services and devices of the enterprise site. For example, the corporate networking services provided via the enterprise intranet may comprise corporate email services, unified storage for company documents and other data to which company employees may need access, and remote access to business applications used in the course of the company's business (e.g., office applications, such as word processing, spreadsheet and database applications, and financial and accounting applications). The enterprise router also provides the routing functionality for routing data transmissions to and from the public network 260 via the VPN gateway 226. The VPN gateway, in turn, provides VPN access to the enterprise intranet, and potentially other enterprise networks (not shown). The network manager (NM), which is connected to VPN gateway via a management interface (e.g., dedicated network interface), configures and monitors the VPN gateway 226 and VPN router 242.

By way of example, the VPN router is responsible for establishing one VPN tunnel per broadband modem (alternatively, for head-end redundancy, the enterprise site may include multiple VPN gateways, and each VPN tunnel would be configured to connect to a different respective VPN gateway at the enterprise site). By way of further example, the VPN tunnels are configured for network address translation (NAT) traversal based on the NAT functions of the respective modems 250, 251, 252. As depicted in FIG. 2, a VPN connection or tunnel 262 (e.g., an Internet Protocol Security (IPSEC) tunnel) is formed between the VPN gateway 226 and the VPN router 242, via the modem 250 and NAP 270, and a VPN connection or tunnel 264 (e.g., an Internet Protocol Security (IPSEC) tunnel) is formed between the VPN gateway 226 and the VPN router 242, via the modem 252 and NAP 280. Accordingly, data transmissions from remote site VPN router to the VPN gateway are encapsulated into IPSEC packets by the VPN router 242. The IPSEC packets are sent over the public network 260 and received by VPN gateway 226, which de-encapsulates the IPSEC packets to obtain the original data transmissions. Similarly, data transmissions from the enterprise site to the remote site are also encapsulated into IPSEC packets by the VPN gateway 226. The IPSEC packets are sent over the public network 260 and received by VPN router 242, which de-encapsulates the IPSEC packets to obtain the original data transmissions.

The packets sent over the VPN tunnels can be configured as standard Internet protocol (IP) packets according to a transmission control protocol (TCP) or a user datagram protocol (UDP). Further, the network 200 may incorporate a network transport enhancement or acceleration functions. According to example embodiments, the VPN router 242 (together with the processing performed by the WAP 244) and the VPN gateway 226 (together with the processing performed by the WOS 128) establish and control such transport enhancement or acceleration functions. With further reference to FIG. 2, for example, each of the VPN tunnels 262, 264 may incorporate a respective acceleration transport. The term "Acceleration Transport" refers to the transmission of packets, by the WAP 244, from the remote LAN 245 to the VPN GW 226 over the WANs 262, 264. Such packet transmissions are sent over the acceleration transports, which are provided through the IPSEC tunnels or WAN transports 262, 264 of the modems 250, 252. By way of example, such network enhancement or acceleration functions may utilize an optimized backbone protocol, referred to as the Terrestrial-Broadband Backbone Protocol (TBP), to carry TCP traffic across the broadband network via the VPN tunnels. The TBP automatically measures and adjusts to available capacity providing performance gains over native TCP across such DSL, EVDO, T1 and other networks (e.g., when operating over networks where there is congestion in the network beyond the last mile link—between each remote site modem and the respective NAP). TBP more effectively recovers from packet loss than native TCP. The enhanced performance-enhancing solution configures the TCP connections to run with a maximum segment size (MSS) that can be efficiently carried by the underlying transport and which avoids packet fragmentation. When compared with native TCP, TBP makes TCP traffic operate with more consistent, and with better performance across broadband networks with congested last, middle and/or public network (e.g., Internet) links or hops, especially in the presence of packet loss.

The WAP 244 is responsible for establishing one acceleration transport per modem, whereby associated WAN characteristics are determined and active or dynamic quality of service prioritization is provided. In order to facilitate this, a pair of LAN or network interface connections 241, 243 are implemented between the VPN router 242 and the WAP 244, whereby the WAP effectively operates as a "middle-man," processing the data traffic traveling between the VPN router LAN interfaces (e.g., to the LAN 245) and the VPN router WAN interfaces (e.g., to the VPN router interfaces for the modem 1 and to the modem 2). In other words, the WAP maintains an acceleration appliance LAN interface (ALS) for receiving packets from and sending packets to the remote LAN 245 via the VPN router 242, and the data traffic/packets from the LAN 245 travel through the VPN router to the WAP via the ALS LAN transport 267. Further, the WAP maintains an acceleration appliance WAN interface (AWS) for sending packets upstream across the WAN via the VPN router 242. To facilitate this, the WAP maintains an AWS IP address configured for each acceleration transport 262, 264, 266.

The VPN router is responsible for establishing the routing for each VPN tunnel and communicating the routing to the VPN gateway. For upstream traffic (from the remote site LAN 245 to the enterprise intranet 222), the VPN router 242 source-routes packets from the IP address AWS-IP-x to the WOS 228 thru the VPN tunnel x. For downstream traffic (from the enterprise intranet 222 to the remote LAN 245), the VPN router configures the IPSEC tunnels so that downstream packets from the WOS 228 to an AWS IP address are routed through and carried by the appropriate IPSEC tunnel and forwarded across the AWS to the WAP 244. The specific acceleration transport addressing for each data packet thus depends on the respective VPN tunnel via which the data packet is to be transmitted (where the associated routing is configured between the VPN router and the VPN gateway for the selected VPN tunnel).

Further, the concept of an acceleration tunnel is related to, but different from, that of an Acceleration Transport. An acceleration tunnel carries a subset of the data traffic of a WAP (for example) that, as a collection, shares access to WAN capacity. The traffic of a particular acceleration tunnel (as a whole) is prioritized to be carried together, and that acceleration tunnel shares WAN capacity with the other acceleration tunnels. An acceleration tunnel competes with other acceleration tunnels for access to the respective Acceleration Transports. According to one embodiment, the WAP supports the following Acceleration Tunnels: (i) IPSEC Acceleration Tunnel, which carries traffic through the IPSEC tunnels; (ii) Split-Tunnel, which carries traffic from a LAN (e.g., the remote LAN 245) directly to/from hosts on the Internet; (iii) Guest Split-Tunnel, which carries traffic to/from a guest LAN directly to/from hosts on the Internet; and (iv) Supplemental Acceleration Tunnel(s), which are optional tunnels that carry all traffic from designated LAN subnets through the IPSEC tunnels (keeping that traffic separated from the traffic of IPSEC acceleration tunnels) competing for and sharing WAN capacity with other tunnels. These tunnels are also referred to as GRE tunnels because like the GRE protocol they keep their traffic completely separated from other traffic.

Figure 3:
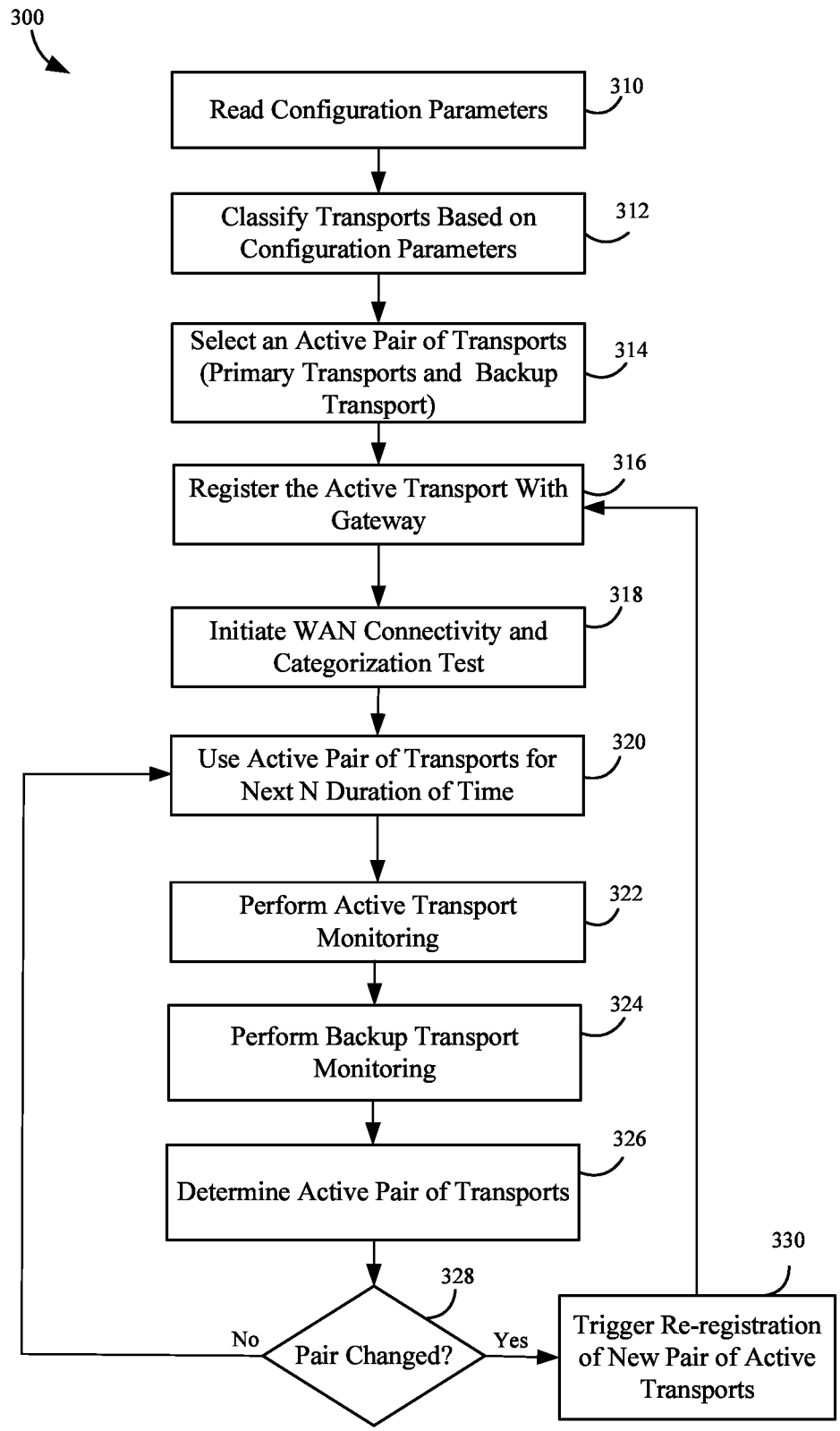
FIG. 3 is a flow chart specifying an example method for cost effective control of multipath WAN transports in accordance with example embodiments.

FIG. 3 is a flow chart specifying an example method for cost effective control of multipath WAN transports in accordance with example embodiments. For example, the process described by the method in FIG. 3 may be executed as a computer-controlled process in the WAP 118 in FIG. 1 or by the WAP 244 in FIG. 2. First, configuration parameters are read or otherwise obtained for the transports (step 310 in FIG. 3). The configuration parameters may include parameters that characterize WAN transports and define transport status monitoring thresholds for available bandwidth capacity, latency, jitter, packet loss and cost. The configuration parameters may be stored as parameters 120 in the SD-WAN device as shown in FIG. 1, or at another suitable location. The method then classifies the transports based on the configuration parameters (step 312). For example, a transport may be classified with a type and associated cost. The transport types may include cellular, satellite, cable, fiber, and unknown. The costs may be set as high (e.g. cellular, low Earth orbit satellite (LEO Sat)), medium (e.g. Geostationary satellite, which is referred to as VSAT here after), or low (e.g. cable or fiber). The method then selects an active pair of transports from the available transports (step 314 in FIG. 3). A backup transport may be selected in addition to the active pair of transports. The transports may be selected based on cost-effectiveness and optimum performance. The WAP 244 may update its gateway, i.e. WOS 228, with its current selection of active and backup transports (step 316).

The method 300 in FIG. 3 may then initiate a WAN connectivity and categorization test (step 318). For this test, the connectivity status of the primary and backup transports may be determined. The connectivity status reflects the health and quality of the transport connection. The classification of the transports may also be checked and updated where necessary. For example, a transport initially classified as unknown may be further classified as satellite or cable based on latency and speed of the connection. Further, the cost of the transport may be re-evaluated when the transport classification has changed.

The method continues with steps 320 through 330 in FIG. 3. These steps reflect the operation of the system during active use of the transports. It should be noted that the order of these steps is by way of example, where other sequences of these steps may be used and are expressly considered within the scope of the claimed embodiments. The system uses the active pair of transports for the next N duration of time (step 320). The system continues to use the active pair of transports for an unspecified period of time as represented by the variable N. The method then performs active transport monitoring (step 322). The active transport monitoring can be accomplished as described below with reference to FIG. 4. The method continues with the system performing backup transport monitoring (step 324). Monitoring the backup transport may be accomplished as described further below with reference to FIG. 5. The method then determines an active pair of transports (step 326). Determination of the active pair and whether to switch to the backup transports may be accomplished as described below with reference to FIG. 9. If the active transport pair is not changed (step 328=no), then the method returns to step 320. Returning to step 320 may include a delay (not shown) to insure the N duration of time. If the active pair is changed (step 328=yes) then the method proceeds to step 330 to trigger re-registration of the new active pair of transports and proceeds to step 316. The new active pair of transports may then register with the transport gateway (step 316).

Figure 4:
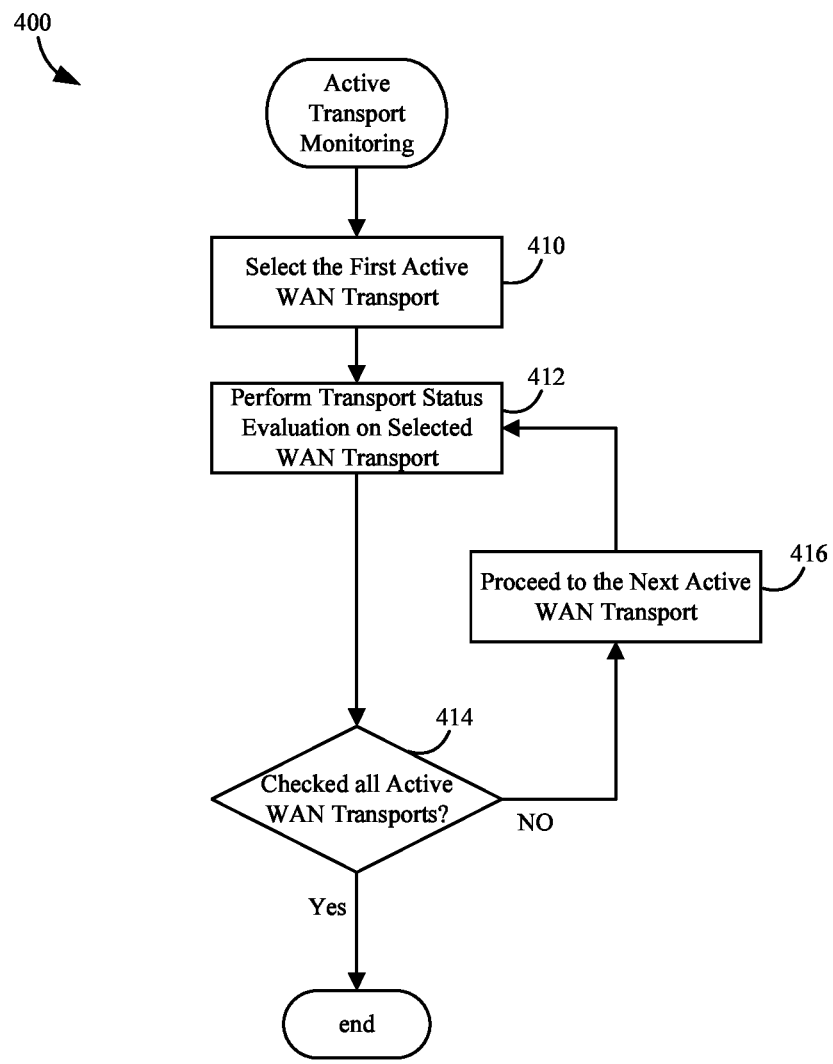
FIG. 4 is a flow chart specifying an example method for active transport monitoring in accordance with example embodiments.
Figure 6:
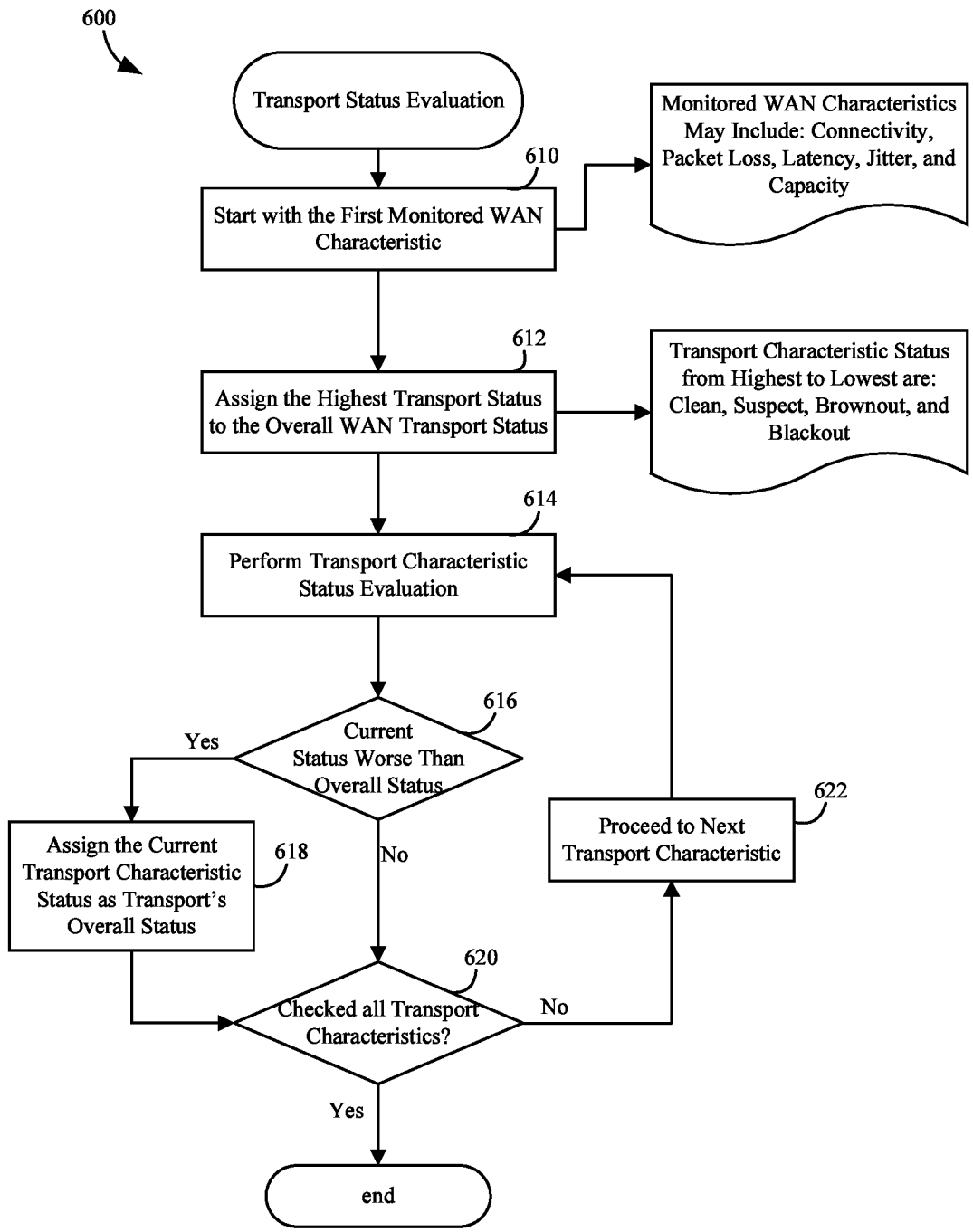
FIG. 6 is a flow chart specifying an example method for transport status evaluation in accordance with example embodiments.
Figure 7:
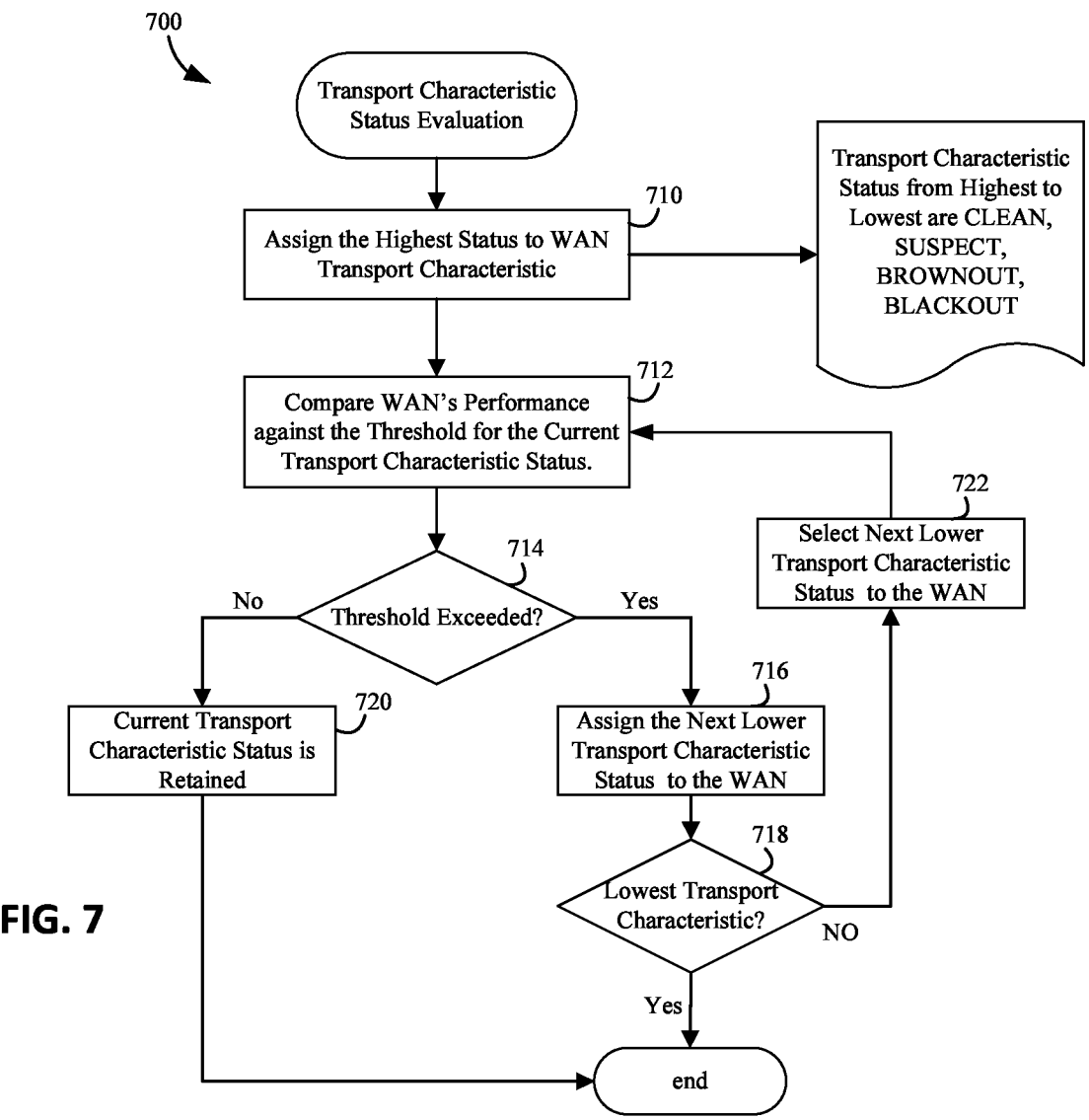
FIG. 7 is a flow chart specifying an example method for transport characteristic status evaluation for connectivity in accordance with example embodiments.

As introduced above, step 322 in Method 300 performs active transport monitoring. An example of active transport monitoring is shown in FIG. 4 and described below with reference to Method 400. Method 400 steps through each of the active transports. In step 412 the method 400 performs transport status evaluation of each active transport. An example of transport status evaluation is shown in FIGS. 6 and 7, and methods 600 and 700. In methods 600 and 700, a WAN transport's overall status is determined after evaluating the status of the WAN transport for any of the essential WAN characteristics—connectivity, packet loss, latency, jitter, and capacity. There are two levels of WAN transport status— (a) the overall transport status, and (b) Transport status for a given WAN characteristic. The overall transport status is given the value of the transport's characteristic with the worst status. For example, a WAN transport may be considered CLEAN from latency WAN characteristic perspective but its transport status from a packet loss WAN characteristic perspective could be SUSPECT. In this case, the overall transport status would become SUSPECT considering that all remaining WAN characteristics are in CLEAN status. FIG. 6 and method 600 show an example of transport status evaluation. Method 600 evaluates the overall transport status of a WAN by iterating through and evaluating the transport status for each WAN characteristic. Method 600 starts off by assigning an overall transport status of CLEAN for a WAN and then checks how well the transport is doing from each of the WAN characteristics perspective. Method 700 shown in FIG. 7 then evaluates how well the transport is doing from a given WAN characteristics perspective. Method 700 determines the transport's status for the WAN characteristics and then checks whether the overall status of the WAN should be updated, which becomes the case when the current WAN characteristics status is worse than the status of any of the WAN characteristics evaluated before. Details of each of these methods (400, 600 and 700) is described further below.

FIG. 4 is a flow chart specifying an example method for active transport monitoring in accordance with example embodiments. Method 400 is an example method for step 322 in method 300 shown in FIG. 3. The method begins by selecting the first active WAN transport (step 410). As there can be more than one active transport, the method steps through each active transport for evaluation by looping through steps 414 through 416. Then the method performs transport status evaluation of the selected WAN transport (step 412). An example of performing transport status evaluation of the selected WAN transport is shown in FIG. 6 and described further below. The method then determines if all active WAN transports have been checked (step 414). If all active WAN transports have not been checked (step 414=no) then the method proceeds to check the next active WAN transport (step 416) and returns to step 412. If all active WAN transports have been checked (step 414=yes) then the method is complete.

Figure 5:
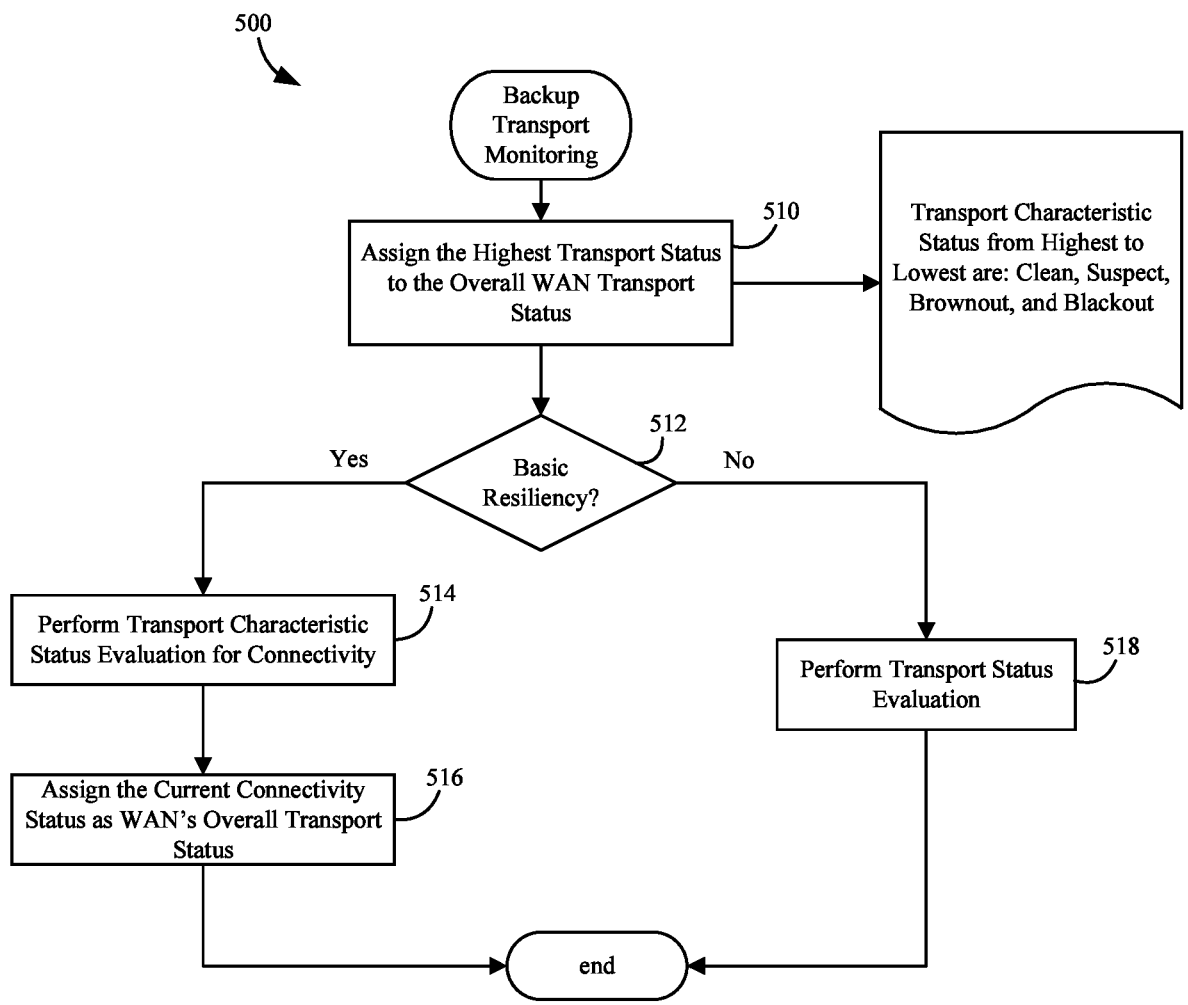
FIG. 5 is a flow chart specifying an example method for backup transport monitoring in accordance with example embodiments.

FIG. 5 is a flow chart specifying an example method 500 for backup transport monitoring in accordance with example embodiments. Method 500 is an example method for step 324 in method 300 shown in FIG. 3. Depending on how the SD WAN device is configured in the setup parameters (112 in FIG. 1), a backup transport status could either be monitored for basic connectivity, i.e., for connectivity characteristic only, or it could be monitored for all WAN characteristics (i.e., the transport is monitored just like an active transport, which would involve sending probing traffic over the backup transport at a higher frequency). SD WAN device 114 would monitor all aspects of its backup transport, i.e., perform periodic evaluation of the WAN's status for each of the WAN characteristics, when the device is configured to cater for high resiliency. As introduced above, the SD-WAN system may overcome the problem of high monitoring costs by monitoring the transports in a cost-effective way such that the more expensive transports in terms of usage cost are avoided except when those transports are needed or anticipated will be needed.

In method 500, monitoring of a backup transport may be limited to only testing for basic connectivity which requires little bandwidth for monitoring when configuration parameters indicate basic connectivity only. Transport monitoring for basic connectivity won't require any bandwidth utilization when the status of a WAN connectivity can be obtained from the modem. However, the appliance would monitor the backup transport for acceptable performance (i.e., monitor the transport's connectivity, latency, jitter, packet loss, and capacity status) when it is configured for high resiliency. SD WAN configured in such a way would promote its backup transport to an active role when one of the active transports becomes BROWNOUT for any of its WAN characteristics, i.e., connectivity, latency, jitter, packet loss or capacity. A higher-cost WAN (such as LEO satellite) would be monitored for acceptable performance (i.e., monitored for connectivity, packet loss, latency, jitter & capacity) only when the WAN has been selected to be an active transport or when the appliance is configured for high resiliency. This could happen when a cheaper transport (such as WiFi or LTE) becomes unavailable. By default, the higher-cost WAN will be monitored for basic connectivity to reduce monitoring costs of the transport. The default behavior can be overridden by means of a configuration parameter when high resiliency is desired. The configuration parameter can be used to override the default behavior where a higher-cost WAN will be monitored for acceptable performance (i.e., monitored for connectivity, packet loss, latency, jitter & capacity) even when that WAN is not selected as active transport.

The method 500 begins by assigning the highest transport status to the overall WAN transport status for the current backup transport. In the illustrated example, the possible transport status for each transport, ranked from highest to lowest, is as follows: Clean, Suspect, Brownout and Blackout. The method then determines if the current backup transport is set for basic connectivity only (step 512). This determination may be performed by checking a resiliency mode configuration parameter set for this transport in the parameters 120 in FIG. 1. Valid values for the "Resiliency Mode" configuration parameter are "Basic Resiliency" or "High Resiliency". The default value of the configuration parameter is "Basic Resiliency" which allows minimizing the cost of the backup transport usage by probing the transport at a long interval. If the resiliency mode is set for basic resiliency (step 512=yes) then the method performs transport characteristic status evaluation for connectivity (step 514). An example of the step of transport characteristic evaluation for connectivity is shown in FIG. 7 and described below. The method then assigns the current connectivity status as the WAN's overall transport status (step 516) and the method is done. If the resiliency mode is set for high resiliency (step 512=no) then the method performs transport status evaluation (step 518). An example of the step of transport status evaluation is shown in FIG. 6 and described below. The method is then complete.

FIG. 6 is a flow chart specifying an example method 600 for transport status evaluation in accordance with example embodiments. Method 600 is an example method for step 518 in method 500 shown in FIG. 5. In summary, Method 600 determines a transport's overall status by performing transport characteristic status evaluation for each characteristic of the transport. The method begins by setting the overall transport status to CLEAN, which is the highest status. The method then compares the overall status to the status of each characteristic to determine whether to assign a lower overall status. When the method ends, the overall transport status holds the status of the characteristic that is in its worst status, where a transport status takes one of the following values which are ordered from best (highest) to worst (lowest)—CLEAN, SUSPECT, BROWNOUT, BLACKOUT.

The method 600 begins by starting with the first monitored WAN characteristic (step 610). The monitored WAN characteristics may include: connectivity, packet loss, latency, jitter and capacity. The method continues by assigning the highest transport status to the overall WAN transport status for the transport (step 612). In the illustrated example, the possible transport status for each transport, ranked from highest to lowest, is as follows: Clean, Suspect, Brownout and Blackout. The method then performs transport characteristic status evaluation (step 614). An example of transport characteristic status evaluation is shown in FIG. 7 and described below. The method then determines if the transport status determined in step 614 for the current WAN characteristic is worse than the overall transport status for this transport (step 616). If the current WAN transport status is not worse than the overall transport characteristic status for this transport (step 616=no) then the method proceeds to step 620. If the transport status for the current WAN characteristic is worse than the overall transport status for this transport (step 616=yes) then the method assigns the current transport characteristic status as the overall transport status (step 618) and proceed to determine if all the transport characteristics have been checked (step 620). If all the transport characteristics have not been checked (step 620=no) then the method proceeds to the next transport characteristic (step 622) and returns to step 614. If all the transport characteristics have been checked (step 620=yes) then the method is done.

FIG. 7 is a flow chart specifying an example method 700 for transport characteristic status evaluation for connectivity in accordance with example embodiments. Method 700 is an example method for step 514 in method 500 shown in FIG. 5 and step 614 shown in FIG. 6. Method 700 begins by assigning the highest status to WAN transport characteristic under evaluation (step 710). In the illustrated example, the possible transport status for each transport, ranked from highest to lowest, is as follows: Clean, Suspect, Brownout and Blackout. The method then compares the WAN's performance against a corresponding threshold for the current transport characteristic status (step 712). The method then determines if the threshold is exceeded for the current transport characteristic status (step 714). If the threshold is not exceeded (step 714=no) then the current transport characteristic status for the WAN is retained (step 720) and the method is done. If the threshold is exceeded (step 714=yes) then the method assigns the next lower transport characteristic status to the WAN (step 716). The method determines if the current transport characteristic status is the lowest transport characteristic status (step 718). If the current transport characteristic status is not the lowest transport characteristic status (step 718=no), then the method selects the next lower transport characteristic status (step 722) and then returns to step 712. If the current transport characteristic status is the lowest transport characteristic status (step 718=yes), then the method is done.

Figure 8:
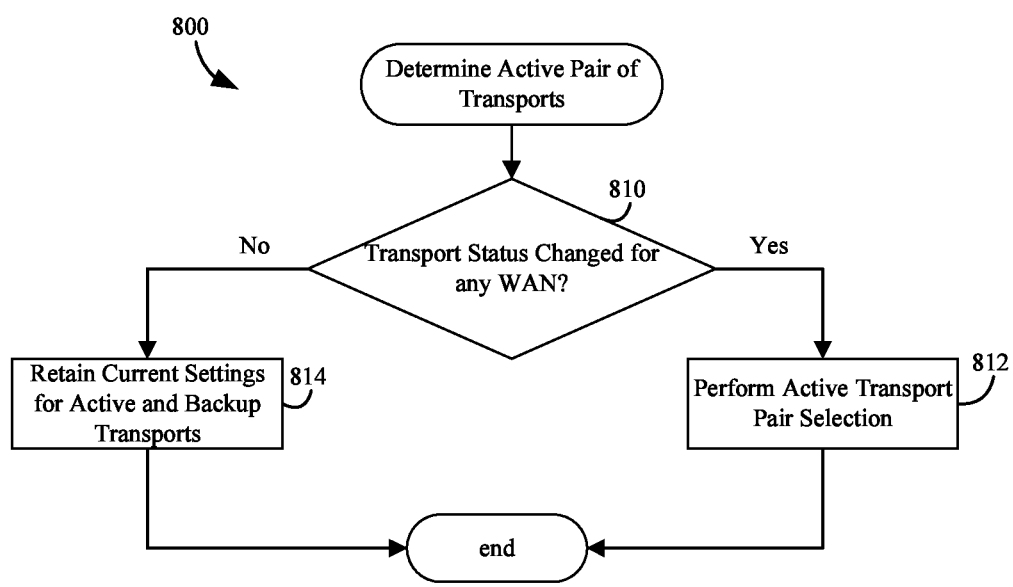
FIG. 8 is a flow chart specifying an example method for determining the active pair of transports in accordance with example embodiments.

FIG. 8 is a flow chart specifying an example method 800 for determining the active pair of transports in accordance with example embodiments. Method 800 is an example method for step 328 in method 300 shown in FIG. 3. The method begins by determining if a transport status has changed (step 810). For example, the status change of a transport may be indicated when performing active transport monitoring (step 322 in method 300) or when performing backup transport monitoring (step 324 in method 300). If the transport status has changed (step 810=yes), then the method performs active transport pair selection (step 812). An example of performing active transport pair selection can be found in method 900 shown in FIG. 9. If the transport status has not changed (step 810=no), then the method retains the current setting for active transport and backup transports (step 814) and the method is done.

Figure 9:
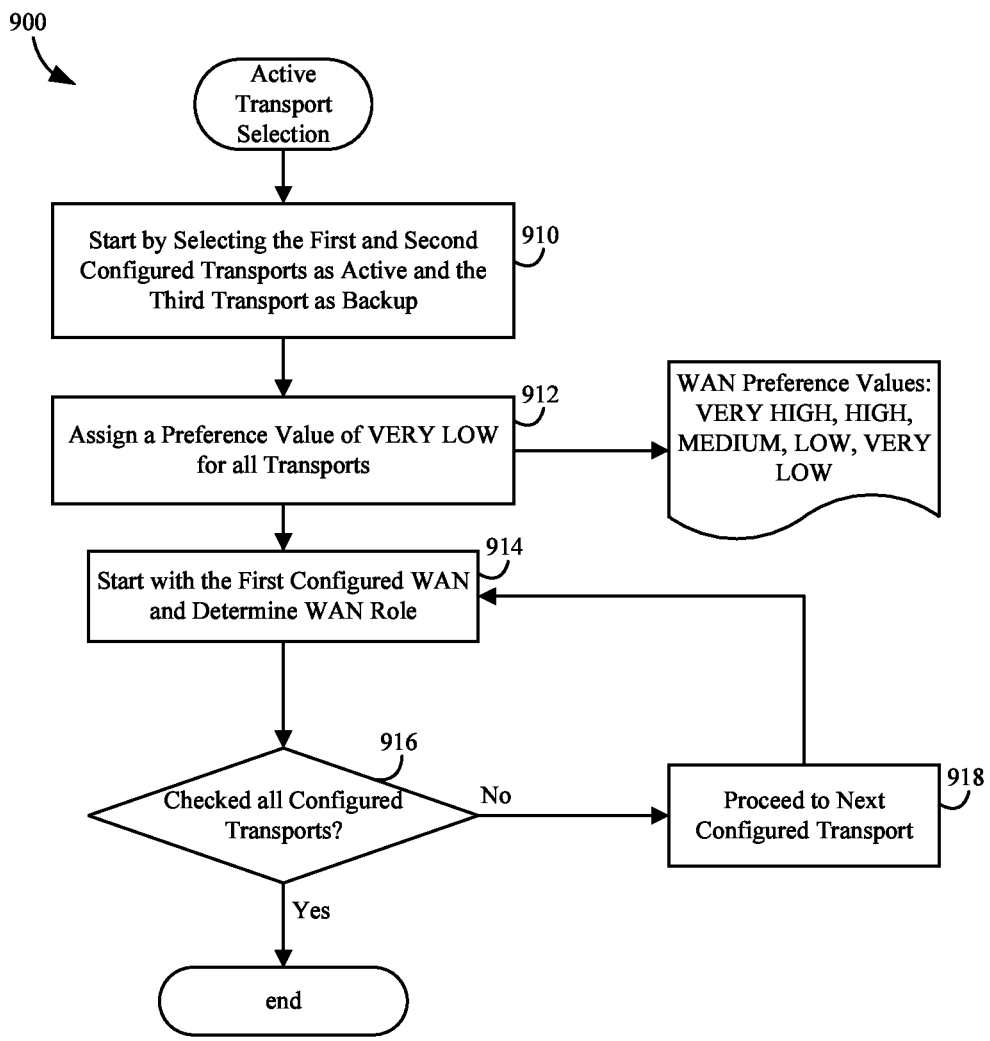
FIG. 9 is a flow chart specifying an example method for active transport selection in accordance with example embodiments.

FIG. 9 is a flow chart specifying an example method 900 for active transport selection in accordance with example embodiments. Method 900 is an example method for step 812 in method 800 shown in FIG. 8. The method begins by selecting the first and second configured transports as active transports and a third transport as the backup transport (step 910). The method 900 then assigns a preference value of Very Low for all transports (step 912). In the illustrated example, the possible preference value for each transport, ranked from highest to lowest, is as follows: Very High, High, Medium, Low, and Very Low. The method then starts with the first configured WAN and determines the WAN role (step 914). An example of determining the WAN role is illustrated in method 1000 and described below. The method 900 then determines if all configured transports have been checked (step 916). If all the configured transports have not been checked (step 918=no), then the method proceeds to the next configured transport (step 918) and returns to step 914 with the next configured transport. If all the configured transports have been checked (step 918=yes), then the method is done.

Figure 10:
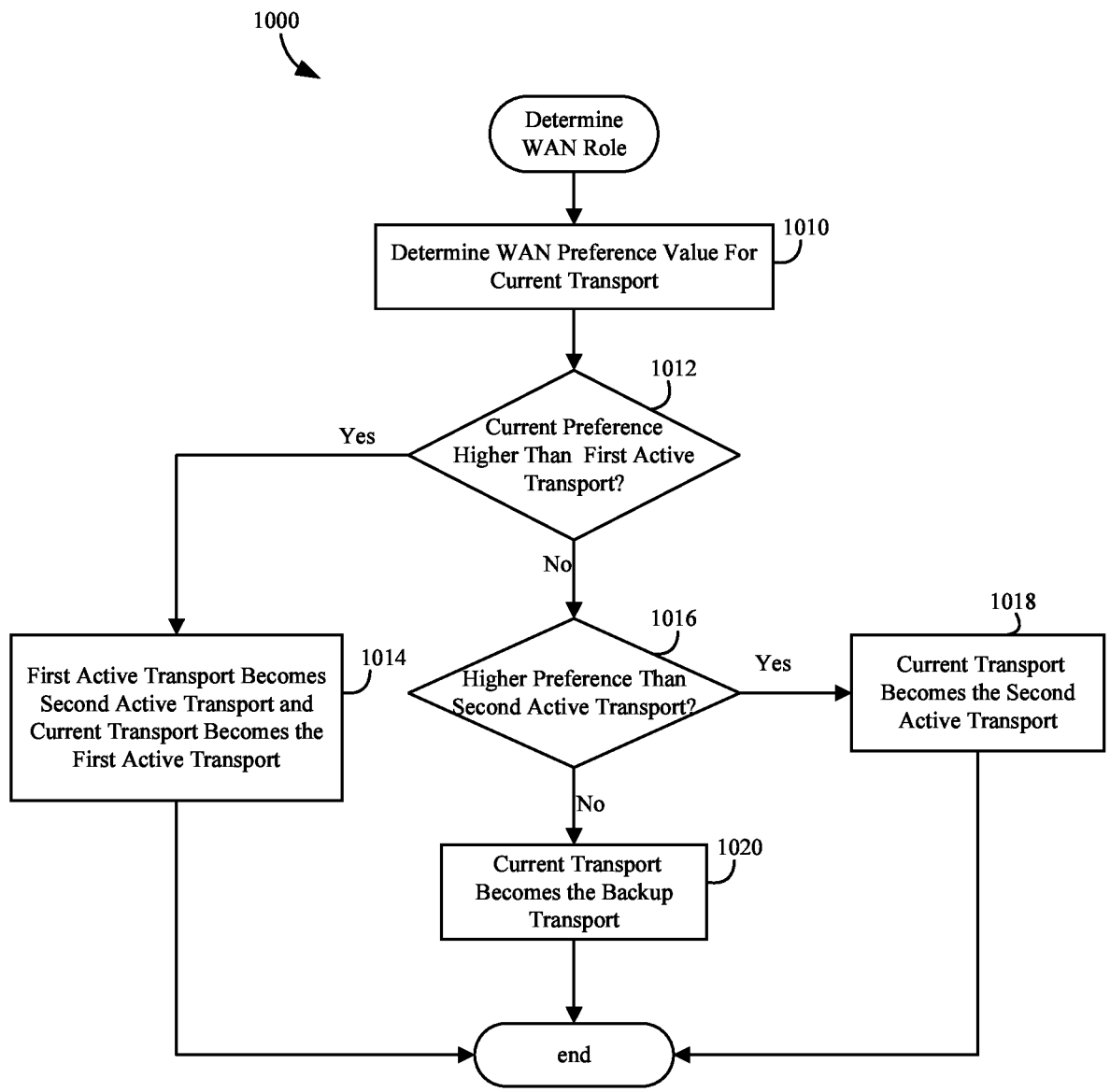
FIG. 10 is a flow chart specifying an example method for determining WAN role.

FIG. 10 is a flow chart specifying an example method 1000 for determining WAN role. Method 1000 is an example method for step 914 in method 900 shown in FIG. 9. The method begins by determining a WAN preference value (step 1010). An example of determining the WAN preference value is illustrated in method 1010 and described below. The method 1000 then determines if the current WAN preference value is a higher preference than the first active transport (step 1012). If the current WAN preference value is a higher preference than the first active transport (step 1012=yes), then the first active transport becomes the second active transport and the current transport becomes the first active transport (step 1014) and the method is done. If the current WAN preference value is not a higher preference than the first active transport (step 1012=no), then the method determines if the current preference is a higher preference than the second active transport (step 1016). If the current preference is a higher preference than the second active transport (step 1016=yes), then the current transport becomes the second active transport (step 1018). If the current preference is not a higher preference than the second active transport (step 1016=no), then the current transport becomes the backup active transport (step 1020) and the method is done.

Figure 11:
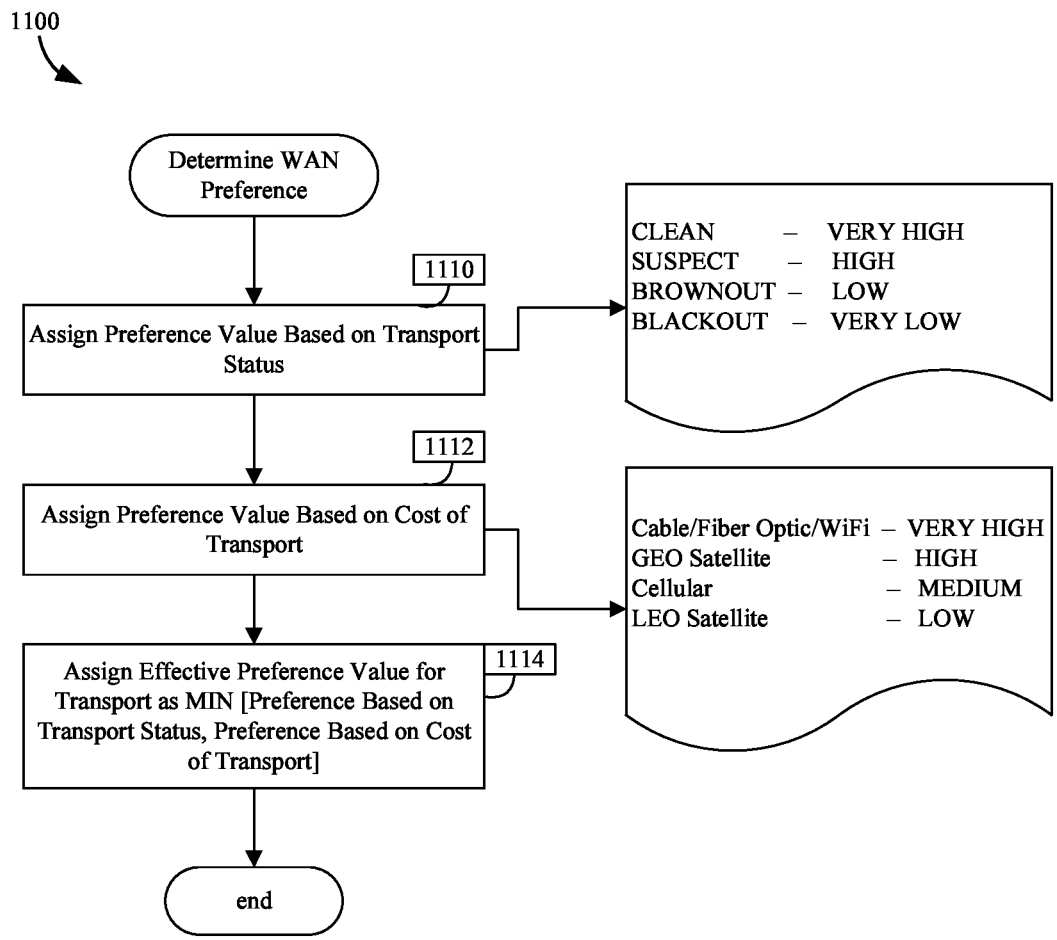
FIG. 11 is a flow chart specifying an example method for determining WAN preference.

FIG. 11 is a flow chart specifying an example method 1100 for determining a WAN preference value. Method 1100 is an example method for step 1010 in method 1000 shown in FIG. 10. The method first assigns a preference value based on the transport status (step 1110). The transport status used for this preference value may be obtained as described above in method 600. A numerical value can be assigned for each status to be used for this preference value. The method then assigns a preference value based on the cost of the transport (step 1112). This preference value may be a numerical value assigned depending on the cost of the transport. The method then assigns an effective preference value to return to step 1010 as the minimum of the preference value based on the transport status and the preference value based on the cost of the transport (step 1114) and the method is done.

Figure 12:
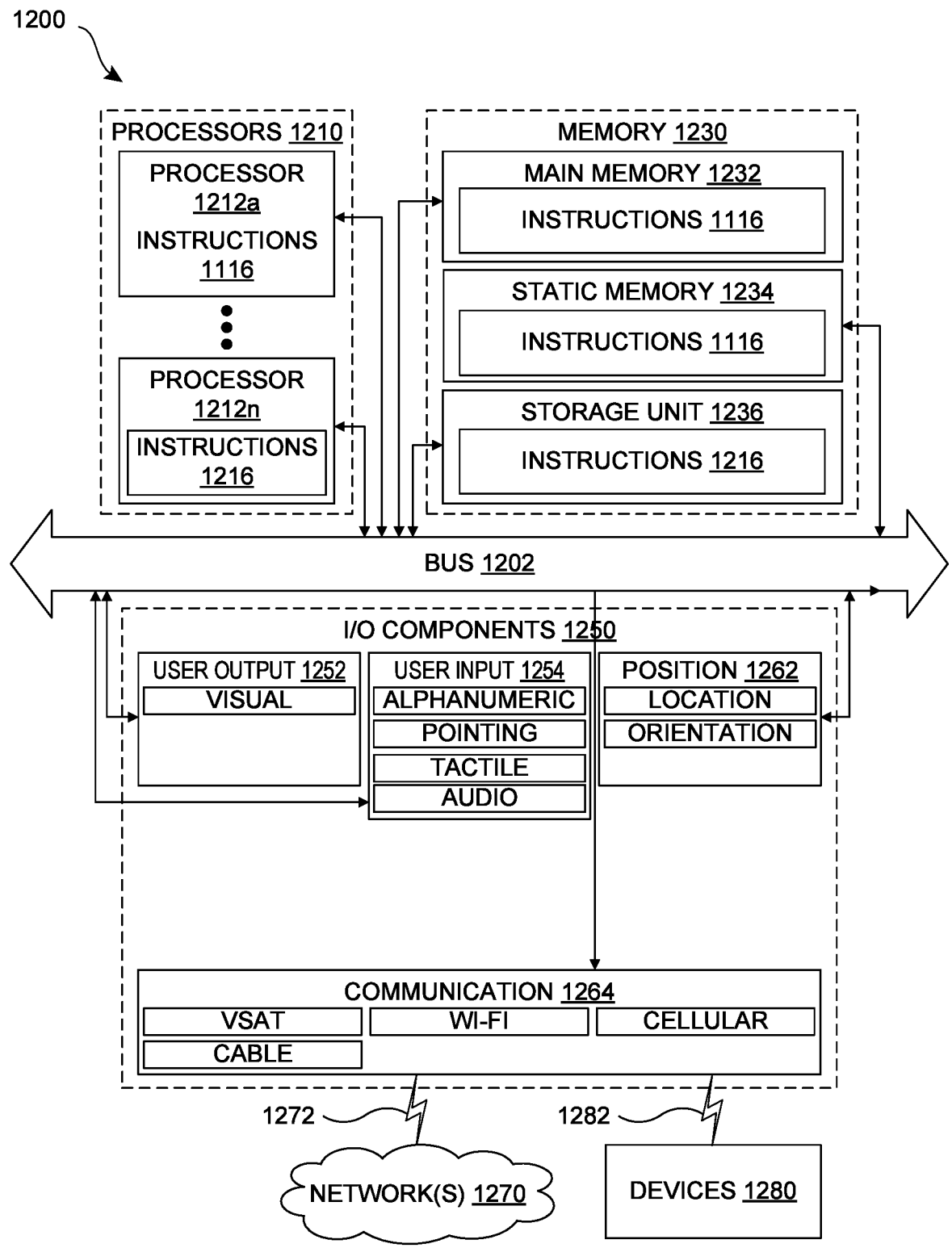
FIG. 12 is a diagram showing components of an example machine configured to read instructions from a machine-readable medium and perform any of the features described herein.

FIG. 12 is a block diagram illustrating components of an example machine 1200 configured to read instructions from a machine-readable medium (for example, a machine-readable storage medium) and perform any of the features described herein. The example machine 1200 is in a form of a computer system, within which instructions 1216 (for example, in the form of software components) for causing the machine 1200 to perform any of the features described herein may be executed. As such, the instructions 1216 may be used to implement modules or components described herein. The instructions 1216 cause unprogrammed and/or unconfigured machine 1200 to operate as a particular machine configured to carry out the described features. The machine 1200 may be configured to operate as a standalone device or may be coupled (for example, networked) to other machines. In a networked deployment, the machine 1200 may operate in the capacity of a server machine or a client machine in a server-client network environment, or as a node in a peer-to-peer or distributed network environment. Machine 1200 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1200 is illustrated, the term "machine" includes a collection of machines that individually or jointly execute the instructions 1216.

The machine 1200 may include processors 1210, memory 1230, and I/O components 1250, which may be communicatively coupled via, for example, a bus 1202. The bus 1202 may include multiple buses coupling various elements of machine 1200 via various bus technologies and protocols. In an example, the processors 1210 (including, for example, a central processing unit (CPU), a graphics processing unit (GPU), a digital signal processor (DSP), an ASIC, or a suitable combination thereof) may include one or more processors 1212a to 1212n that may execute the instructions 1216 and process data. In some examples, one or more processors 1210 may execute instructions provided or identified by one or more other processors 1210. The term "processor" includes a multi-core processor including cores that may execute instructions contemporaneously. Although FIG. 12 shows multiple processors, the machine 1200 may include a single processor with a single core, a single processor with multiple cores (for example, a multi-core processor), multiple processors each with a single core, multiple processors each with multiple cores, or any combination thereof. In some examples, the machine 1200 may include multiple processors distributed among multiple machines.

The memory/storage 1230 may include a main memory 1232, a static memory 1234, or other memory, and a storage unit 1236, both accessible to the processors 1210 such as via the bus 1202. The storage unit 1236 and memory 1232, 1234 store instructions 1216 embodying any one or more of the functions described herein. The memory/storage 1230 may also store temporary, intermediate, and/or long-term data for processors 1210. The instructions 1216 may also reside, completely or partially, within the memory 1232, 1234, within the storage unit 1236, within at least one of the processors 1210 (for example, within a command buffer or cache memory), within memory at least one of I/O components 1250, or any suitable combination thereof, during execution thereof. Accordingly, the memory 1232, 1234, the storage unit 1236, memory in processors 1210, and memory in I/O components 1250 are examples of machine-readable media.

As used herein, "machine-readable medium" refers to a device able to temporarily or permanently store instructions and data that cause machine 1200 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1216) for execution by a machine 1200 such that the instructions, when executed by one or more processors 1210 of the machine 1200, cause the machine 1200 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1250 may include a wide variety of hardware components adapted to receive input, provide output, produce output, transmit information, exchange information, capture measurements, and so on. The specific I/O components 1250 included in a particular machine will depend on the type and/or function of the machine. For example, mobile devices such as mobile phones may include a touch input device, whereas a headless server or IoT device may not include such a touch input device. The particular examples of I/O components illustrated in FIG. 12 are in no way limiting, and other types of components may be included in machine 1200. The grouping of I/O components 1250 are merely for simplifying this discussion, and the grouping is in no way limiting. In various examples, the I/O components 1250 may include user output components 1252 and user input components 1254. User output components 1252 may include, for example, visual display components for displaying information (for example, a liquid crystal display (LCD) or a projector), and/or other signal generators. User input components 1254 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1250 may include position components 1262, among a wide array of other physical sensor components. The position components 1262 may include, for example, location sensors (for example, a Global Position System (GPS) receiver), altitude sensors (for example, an air pressure sensor from which altitude may be derived), and/or orientation sensors (for example, magnetometers).

The I/O components 1250 may include communication components 1264, implementing a wide variety of technologies operable to couple the machine 1200 to network(s) 1270 and/or device(s) 1280 via respective communicative couplings 1272 and 1282. The communication components 1264 may include one or more network interface components or other suitable devices to interface with the network(s) 1270. The communication components 1264 may include, for example, components adapted to provide cellular communication, VSAT, Cable and Wi-Fi, and/or communication via other modalities. The device(s) 1280 may include other machines or various peripheral devices (for example, coupled via USB).

Figure 13:
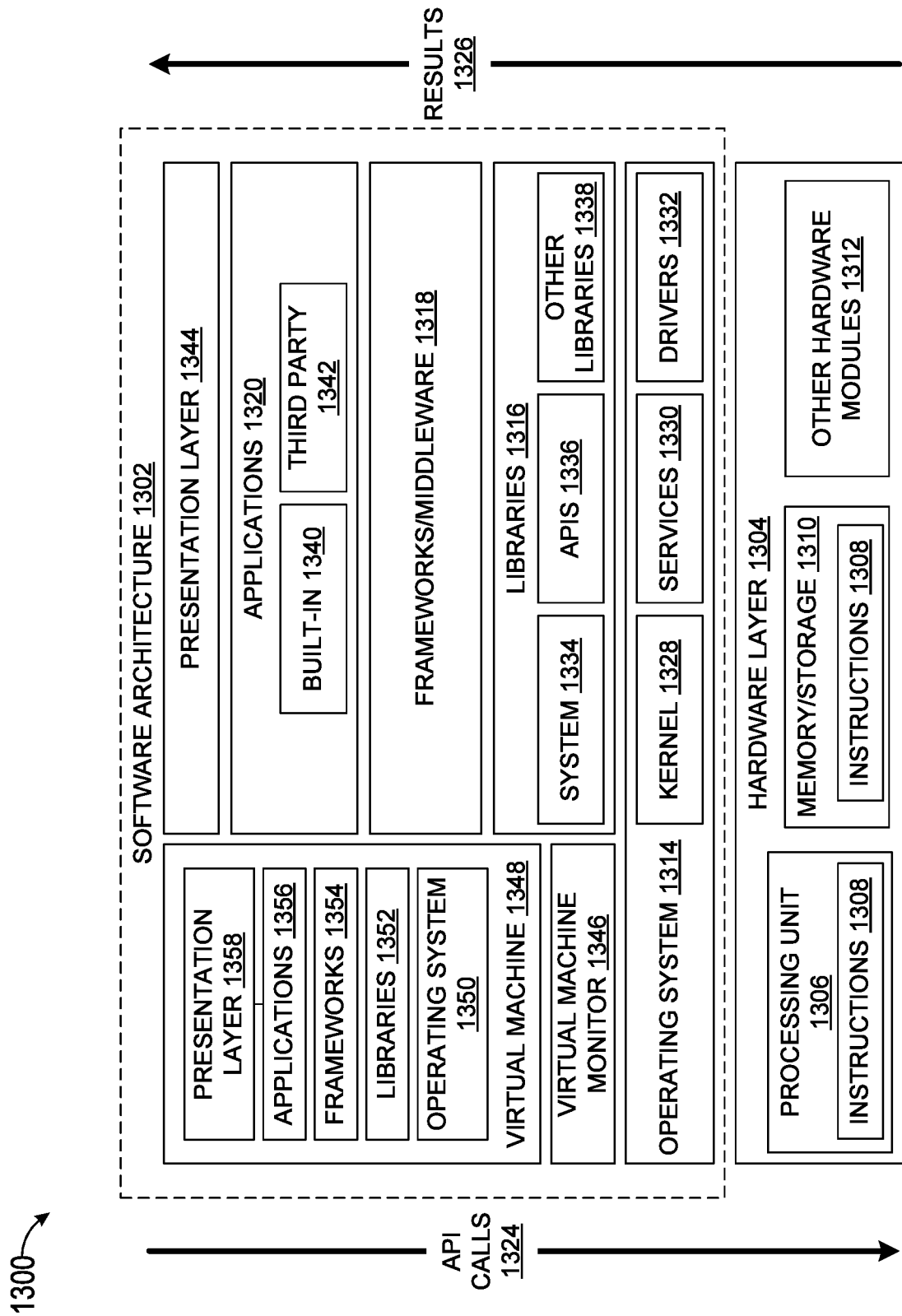
FIG. 13 is a block diagram showing an example software architecture, various portions of which may be used in conjunction with various hardware architectures herein described, which may implement any of the features described herein.

FIG. 13 is a block diagram 1300 illustrating an example software architecture 1302, various portions of which may be used in conjunction with various hardware architectures herein described, which may implement any of the above-described features. FIG. 13 is a non-limiting example of a software architecture and it will be appreciated that many other architectures may be implemented to facilitate the functionality described herein. The software architecture 1302 may execute on hardware such as a machine 1200 of FIG. 12 that includes, among other things, processors 1210, memory 1230, and input/output (I/O) components 1250. A representative hardware layer 1304 is illustrated and can represent, for example, the machine 1200 of FIG. 12. The representative hardware layer 1304 includes a processing unit 1306 and associated executable instructions 1308. The executable instructions 1308 represent executable instructions of the software architecture 1302, including implementation of the methods, modules and so forth described herein. The hardware layer 1304 also includes a memory/storage 1310, which also includes the executable instructions 1308 and accompanying data. The hardware layer 1304 may also include other hardware modules 1312. Instructions 1308 held by processing unit 1308 may be portions of instructions 1308 held by the memory/storage 1310.

The example software architecture 1302 may be conceptualized as layers, each providing various functionality. For example, the software architecture 1302 may include layers and components such as an operating system (OS) 1314, libraries 1316, frameworks 1318, applications 1320, and a presentation layer 1344. Operationally, the applications 1320 and/or other components within the layers may invoke API calls 1324 to other layers and receive corresponding results 1326. The layers illustrated are representative in nature and other software architectures may include additional or different layers. For example, some mobile or special purpose operating systems may not provide the frameworks/middleware 1318.

The OS 1314 may manage hardware resources and provide common services. The OS 1314 may include, for example, a kernel 1328, services 1330, and drivers 1332. The kernel 1328 may act as an abstraction layer between the hardware layer 1304 and other software layers.

For example, the kernel 1328 may be responsible for memory management, processor management (for example, scheduling), component management, networking, security settings, and so on. The services 1330 may provide other common services for the other software layers. The drivers 1332 may be responsible for controlling or interfacing with the underlying hardware layer 1304. For instance, the drivers 1332 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1316 may provide a common infrastructure that may be used by the applications 1320 and/or other components and/or layers. The libraries 1316 typically provide functionality for use by other software modules to perform tasks, rather than rather than interacting directly with the OS 1314. The libraries 1316 may include system libraries 1334 (for example, C standard library) that may provide functions such as memory allocation, string manipulation, file operations. In addition, the libraries 1316 may include API libraries 1336 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1316 may also include a wide variety of other libraries 1338 to provide many functions for applications 1320 and other software modules.

The frameworks 1218 (also sometimes referred to as middleware) provide a higher-level common infrastructure that may be used by the applications 1320 and/or other software modules. For example, the frameworks 1318 may provide various graphic user interface (GUI) functions, high-level resource management, or high-level location services. The frameworks 1318 may provide a broad spectrum of other APIs for applications 1320 and/or other software modules.

The applications 1320 include built-in applications 1340 and/or third-party applications 1342. Examples of built-in applications 1340 may include, but are not limited to, a contacts application, a browser application, a location application, a media application, a messaging application, and/or a game application. Third-party applications 1342 may include any applications developed by an entity other than the vendor of the particular platform. The applications 1320 may use functions available via OS 1314, libraries 1316, frameworks 1318, and presentation layer 1344 to create user interfaces to interact with users.

Some software architectures use virtual machines, as illustrated by a virtual machine 1248. The virtual machine 1348 provides an execution environment where applications/modules can execute as if they were executing on a hardware machine (such as the machine 1200 of FIG. 12, for example). The virtual machine 1348 may be hosted by a host OS (for example, OS 1314) or hypervisor, and may have a virtual machine monitor 1346 which manages operation of the virtual machine 1348 and interoperation with the host operating system. A software architecture, which may be different from software architecture 1202 outside of the virtual machine, executes within the virtual machine 1348 such as an OS 1314, libraries 1372, frameworks 1354, applications 1356, and/or a presentation layer 1358.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A software defined wide area network (SD-WAN) device comprising:
   a plurality of WAN transports that connect a client device to a network resource;
   a processor with a memory, wherein the memory stores instructions that, when executed, cause the processor to perform the functions of:
   selecting an active WAN transport from the plurality of WAN transports to provide internet services to a client device connected to the SD-WAN over the active WAN transport;
   using the active WAN transport for a duration of time while performing active transport monitoring and backup transport monitoring;
   wherein the backup transport monitoring includes determining that a WAN transport is set for testing only basic connectivity, and where the WAN transport is set for testing only basic connectivity performing transport characteristic evaluation for connectivity of the WAN transport to limit resource costs of monitoring the backup resource;
   assigning a highest transport status as an overall WAN transport status;
   when the transport is set for basic connectivity only, performing transport characteristic status evaluation for connectivity; and when the transport is not set for basic connectivity only, performing transport status evaluation;
   performing transport characteristic status evaluation for each of a plurality of monitored WAN characteristics including connectivity, packet loss, latency, jitter and capacity of the transport; and
   evaluating performance of a WAN transport against a performance threshold for each of the WAN characteristic statuses.

2. The SD-WAN of claim 1, wherein determining a WAN transport is set for testing only basic connectivity comprises checking a parameter for the WAN transport in the SD-WAN device.

3. The SD-WAN of claim 2, wherein the WAN transport is by default set for testing only basic connectivity and the parameter for the WAN transport in the SD-WAN device may override the default.

4. The SD-WAN of claim 1, wherein selecting an active WAN transport further comprises selecting a pair of active WAN transports and a backup WAN transport.

5. The SD-WAN of claim 1, wherein the network resource is selected from an enterprise site and a web service.

6. The SD-WAN of claim 1, further comprising a virtual private router and a WAN acceleration appliance.

7. A method of communicating over a communication system comprising:
   selecting an active WAN transport connected to an SD-WAN from a plurality of network WAN transports to provide internet services to a client device connected to the SD-WAN over the active WAN transport; and
   using the active WAN transport for a duration of time while performing active transport monitoring and backup transport monitoring;
   wherein the backup transport monitoring includes determining that a WAN transport is set for testing only basic connectivity, and where the WAN transport is set for testing only basic connectivity performing transport characteristic evaluation for connectivity of the WAN transport to limit resource costs of monitoring the WAN transport;
   assigning a highest transport status as an overall WAN transport status;
   when the transport is set for basic connectivity only, performing transport characteristic status evaluation for connectivity;
   when the transport is not set for basic connectivity only, performing transport status evaluation;
   performing transport characteristic status evaluation for each of a plurality of monitored WAN characteristics including connectivity, packet loss, latency, jitter and capacity of the transport; and
   evaluating performance of a WAN transport against a performance threshold for each of the WAN characteristic statuses.

8. The method of claim 7, wherein determining that the WAN transport is set for testing only basic connectivity comprises checking a parameter for the WAN transport in a SD-WAN device.

9. The method of claim 8, wherein the WAN transport is, by default, set for testing only basic connectivity, and checking whether the parameter for the WAN transport in the SD-WAN device override the default.

10. The method of claim 7, wherein selecting the active WAN transports further comprises selecting a pair of active WAN transports and a backup WAN transport.

11. The method of claim 7, wherein the network resource is selected from an enterprise site and a web service.

12. A software defined wide area network (SD-WAN) device, comprising:
    a plurality of WAN transports that connect a client device to a network resource;
    a processor with a memory storing instructions that, when executed, cause the processor to perform the functions of:
    selecting an active pair of WAN transports from the plurality of WAN transports to provide internet services to a client device connected to the SD-WAN over the pair active WAN transports;
    using the active pair of WAN transports for a duration of time while performing active transport monitoring and backup transport monitoring; wherein:
    backup transport monitoring includes determining that the backup WAN transport is set for testing only basic connectivity, and where the WAN transport is set for testing only basic connectivity performing transport characteristic evaluation for connectivity of the WAN transport to limit resource costs of monitoring the backup resource;
    determining that the backup WAN transport is set for testing only basic connectivity comprises checking a parameter for the backup WAN transport in the SD-WAN device;
    by default, setting the backup WAN transport for testing only basic connectivity and checking whether the parameter for the WAN transport in the SD-WAN device may override the default:
    wherein the instructions further cause the processor to:
    assign a highest transport status as an overall WAN transport status; wherein when the transport is set for basic connectivity only, performing transport characteristic status evaluation for connectivity; and wherein when the transport is not set for basic connectivity only, performing transport status evaluation;
    perform transport characteristic status evaluation for each of a plurality of monitored WAN characteristics including connectivity, packet loss, latency, jitter and capacity of the transport; and
    evaluate performance of a WAN transport against a performance threshold for each of the WAN characteristic statuses.

13. The SD-WAN of claim 12, wherein the network resource is selected from an enterprise site and a web service.

* * * * *